United States Patent
Zhang et al.

(10) Patent No.: US 9,634,528 B2
(45) Date of Patent: Apr. 25, 2017

(54) EFFICIENT ELECTRIC MACHINE

(71) Applicant: Brose Fahrzeugteile GmbH & Co. KG, Wuerzburg, Wuerzburg (DE)

(72) Inventors: Sunny Zhang, Wuerzburg (DE); Daniel Fiederling, Wertheim (DE); Joachim Baumgartner, Volbach (DE); Jin Xu, Wuerzburg (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 366 days.

(21) Appl. No.: 14/485,326

(22) Filed: Sep. 12, 2014

(65) Prior Publication Data

US 2015/0001980 A1 Jan. 1, 2015

Related U.S. Application Data

(63) Continuation of application No. PCT/EP2013/000741, filed on Mar. 13, 2013.

(30) Foreign Application Priority Data

Mar. 13, 2012 (DE) .......................... 10 2012 005 141
Oct. 25, 2012 (DE) .......................... 10 2012 020 927
(Continued)

(51) Int. Cl.
*H02K 21/12* (2006.01)
*H02K 1/02* (2006.01)
(Continued)

(52) U.S. Cl.
CPC ................ *H02K 1/02* (2013.01); *H02K 1/06* (2013.01); *H02K 1/17* (2013.01); *H02K 1/27* (2013.01);
(Continued)

(58) Field of Classification Search
CPC ........ H02K 15/03; H02K 1/27; H02K 1/2753; H02K 1/2773
(Continued)

(56) References Cited

U.S. PATENT DOCUMENTS 5,280,209 A * 1/1994 Leupold ................ H02K 1/278
310/156.41
5,962,944 A 10/1999 Narita et al.
(Continued)

FOREIGN PATENT DOCUMENTS

CN 1215942 A 5/1999
CN 1375122 A 10/2002
(Continued)

OTHER PUBLICATIONS

Chinese Office Action for Chinese Application No. 201280071454.7 dated Apr. 29, 2016—English translation.
(Continued)

*Primary Examiner* — Thanh Lam
(74) *Attorney, Agent, or Firm* — Muncy, Geissler, Olds & Lowe, P.C.

(57) ABSTRACT

An electric machine having a stator and a rotor which is mounted so as to be rotatable about a rotor axis and has a rotor body, in which at least two permanent magnets are arranged in receptacles, a first of which component magnets is associated with a first set of permanent magnets, and a second of which component magnets is associated with a second set of permanent magnets. The permanent magnets of the first set differ from the permanent magnets of the second set with respect to the material composition, In particular to the magnetic properties, and wherein at least one permanent magnet of the first or second set or at least one composite body has a contour, the cross-sectional face of which, being located perpendicularly with respect to the
(Continued)

longitudinal axis, decreases within the respective receptacle towards that end thereof which is radially further to the outside.

13 Claims, 7 Drawing Sheets

(30) Foreign Application Priority Data

Oct. 25, 2012 (WO) .................. PCT/EP2012/004460
Oct. 25, 2012 (WO) .................. PCT/EP2012/004461
Oct. 25, 2012 (WO) .................. PCT/EP2012/004462

(51) Int. Cl.
*H02K 21/16* (2006.01)
*H02K 1/27* (2006.01)
*H02K 1/06* (2006.01)
*H02K 1/17* (2006.01)
*H02K 3/46* (2006.01)

(52) U.S. Cl.
CPC ........... *H02K 1/276* (2013.01); *H02K 1/2766* (2013.01); *H02K 1/2773* (2013.01); *H02K 3/46* (2013.01); *H02K 21/16* (2013.01); *H02K 2201/03* (2013.01); *H02K 2213/03* (2013.01)

(58) Field of Classification Search
USPC ............. 310/156.38–156.45, 156.53, 156.56
See application file for complete search history.

(56) References Cited

U.S. PATENT DOCUMENTS

| | | | |
|---|---|---|---|
| 6,472,789 B1* | 10/2002 | Akemakou | H02K 21/042 310/156.49 |
| 7,556,082 B2 | 7/2009 | Welchko et al. | |
| 8,269,390 B2 | 9/2012 | Sakai et al. | |
| 2005/0040721 A1 | 2/2005 | Kusase et al. | |
| 2007/0284960 A1 | 12/2007 | Fulton et al. | |
| 2008/0231132 A1 | 9/2008 | Minowa et al. | |
| 2009/0115280 A1* | 5/2009 | Nakayama | H02K 1/2766 310/156.53 |
| 2009/0230803 A1* | 9/2009 | Nakayama | H02K 1/2766 310/156.56 |
| 2009/0236923 A1* | 9/2009 | Sakai | H02K 1/2766 310/156.43 |
| 2010/0019597 A1* | 1/2010 | Kolehmainen | H02K 1/2766 310/156.11 |
| 2010/0072850 A1 | 3/2010 | Miyata et al. | |
| 2010/0277017 A1 | 11/2010 | Alexander et al. | |
| 2011/0315913 A1 | 12/2011 | Shigeoka et al. | |
| 2013/0127280 A1 | 5/2013 | Sugimoto et al. | |
| 2013/0241324 A1* | 9/2013 | Mader | H02K 1/28 310/45 |
| 2013/0278106 A1* | 10/2013 | Kim | H02K 1/2766 310/156.53 |

FOREIGN PATENT DOCUMENTS

| | | |
|---|---|---|
| CN | 101047325 A | 10/2007 |
| CN | 101232205 A | 7/2008 |
| CN | 101485064 A | 7/2009 |
| CN | 101946386 A | 1/2011 |
| CN | 102044944 A | 5/2011 |
| CN | 102300655 A | 12/2011 |
| DE | 10 2007 015 839 A1 | 10/2008 |
| DE | 10 2009 000 028 A1 | 7/2010 |
| EP | 1 223 658 A1 | 7/2002 |
| EP | 2 246 961 A1 | 11/2010 |
| EP | 2 360 814 A1 | 8/2011 |
| JP | S 59-61008 A | 4/1984 |
| JP | S 60-219947 A | 11/1985 |
| JP | H 08-340651 A | 12/1996 |
| JP | H 10-304610 A | 11/1998 |
| JP | 2003-017309 A | 1/2003 |
| JP | 2006-115663 A | 4/2006 |
| JP | 2007-208104 A | 8/2007 |
| JP | 2009-027846 A | 2/2009 |
| JP | 2010-098863 A | 4/2010 |
| JP | 2010-130859 A | 6/2010 |
| JP | 5398103 B2 | 1/2014 |
| WO | WO 01/22560 A1 | 3/2001 |
| WO | WO 2006/109615 A1 | 10/2006 |
| WO | WO 2007/146208 A1 | 12/2007 |
| WO | WO 2012/014260 A1 | 2/2012 |

OTHER PUBLICATIONS

Chinese Office Action for Chinese Application No. 201380014358.3 dated Apr. 26, 2016—English translation.
Japanese Office Action for Japanese Application No. 2014-561290 dated Jul. 5, 2016—English translation.
Japanese Office Action for Japanese Application No. 2014-561291 dated Aug. 30, 2016 with partial English translation.
U.S. Appl. No. 14/485,184, filed Sep. 12, 2014.
U.S. Appl. No. 14/485,266, filed Sep. 12, 2014.
U.S. Appl. No. 14/485,213, filed Sep. 12, 2014.
Chinese Office Action for Chinese Application No. 201380014379.5 dated Sep. 28, 2016—English translation.
Chinese Office Action for Chinese Application No. 201280071454.7 dated Dec. 30, 2016—English translation.

* cited by examiner

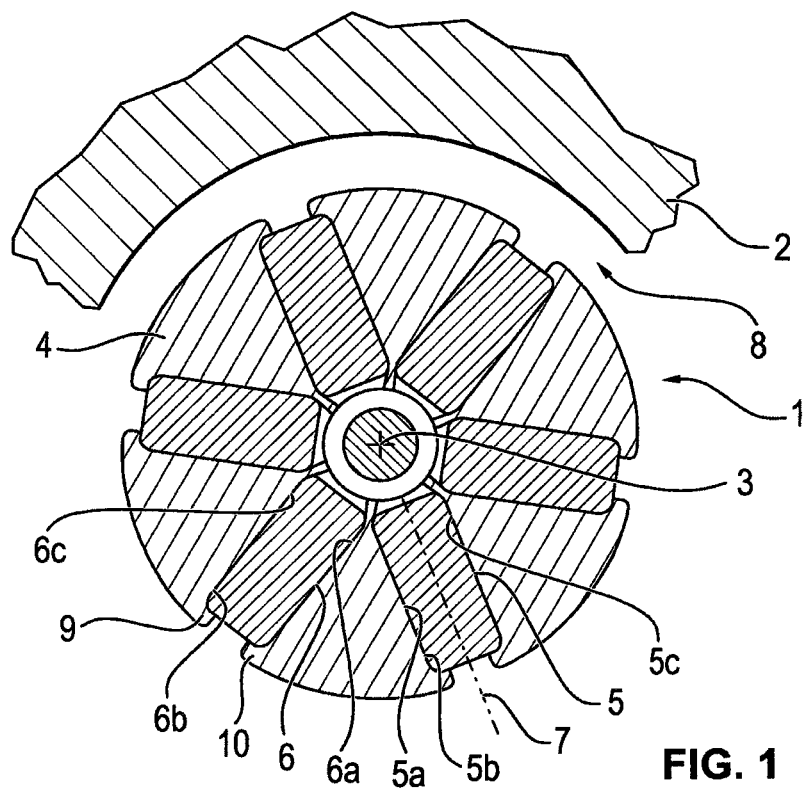

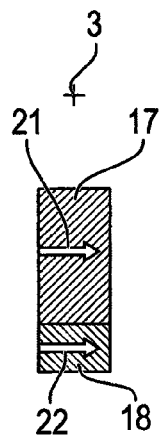 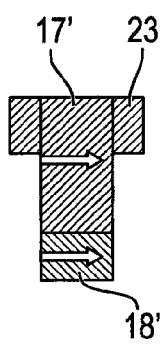 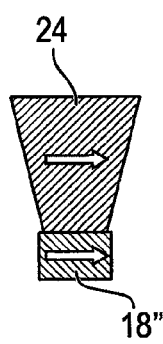 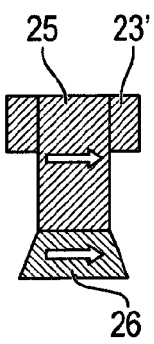 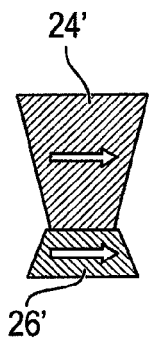
FIG. 3   FIG. 4   FIG. 5   FIG. 6   FIG. 7
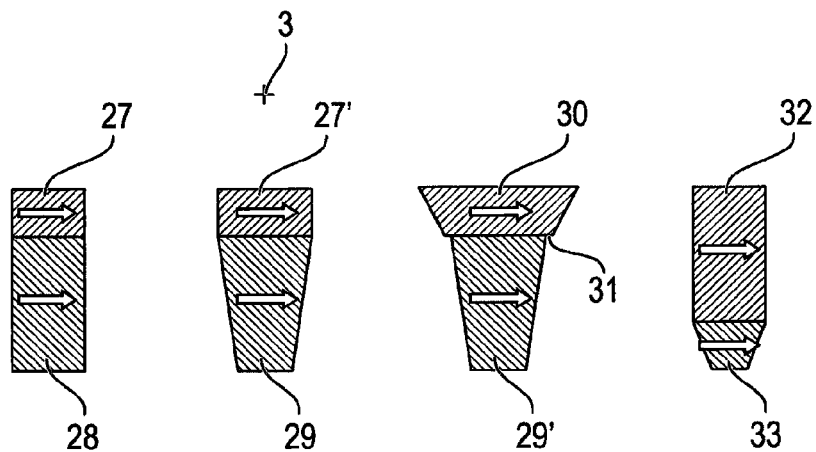
FIG. 8   FIG. 9   FIG. 10   FIG. 11

EFFICIENT ELECTRIC MACHINE

This nonprovisional application is a continuation of International Application No. PCT/EP2013/000741, which was filed on Mar. 13, 2013, and which claims priority to German Patent Application No. 10 2012 005 141.7, which was filed in Germany on Mar. 13, 2012, German Patent Application No. 10 2012 020 927.4, which was filed in Germany on Oct. 25, 2012, International Patent Application No. PCT/EP2012/004460, which was filed on Oct. 25, 2012, International Patent Application No. PCT/EP2012/004461, which was filed on Oct. 25, 2012, and International Patent Application No. PCT/EP2012/004462, which was filed on Oct. 25, 2012 and which are all herein incorporated by reference.

BACKGROUND OF THE INVENTION

Field of the Invention

The invention relates to the field of electrotechnology and relates particularly to rotating electrical machines, therefore, for example, electric motors or generators.

Description of the Background Art

Particularly in automotive technology, i.e., in motor vehicles, electric motors are used increasingly in the form of actuating elements for assisting the driver or passengers (window lifter, sun roof drive, seat adjustment). In addition, electric motors are also used in support systems for the drive, for example, as an actuator for the gear unit and as fan motors and also in the actual vehicle drive itself. The electric motors employed there must satisfy more stringent requirements in that they are to be light to reduce vehicle weight and nevertheless have a high power density. In addition, a long service life and high reliability are required. Finally, particularly in the case of motors used near an internal combustion engine, an adequate operational reliability is required at temperatures of at least 120° C. or up to 180° C. as well Basically brushed electric motors (commutator motors) or brushless electric motors can be used, whose motor is operated in a rotating field of a stator, whereby typically the stator is equipped with suitably controlled windings and the rotor is equipped with permanent magnets. Both the rotor and the stator are typically constructed by using lamination stacks, whereby the individual laminations are insulated from one another to reduce parasitic eddy currents, for example, by coated layers. Within the lamination stacks, so-called stator teeth with stator slots lying inbetween are provided in the stator, whereby the stator teeth support a field winding, which is disposed within the stator slots. The field winding is often controlled by an electronic circuit, which energizes individual winding parts according to a time regime and thereby generates a rotating field, whereby a pulse-width modulation technique is often used for controlling.

If high requirements for efficiency and power density are imposed on such motors, it becomes necessary for the rotor gap, i.e., the gap between the rotor and stator which also determines the distance between the permanent magnets, on the one hand, and the magnetic poles, on the other, to be designed to be as small as possible. Undesirable magnetic fields can arise in this case, for example, by self-induction, which can lead to demagnetization of the permanent magnets, particularly at higher operating temperatures. This consequently leads to a reduction of the performance and power density of the machine. To prevent this, magnetic materials or alloys with as high a coercive field strength as possible are usually used. Alloys with components or fractions of rare earth elements are often used to achieve the highest possible coercive field strength. Especially so-called heavy rare earth elements such as, for example, terbium and dysprosium have a high coercive field strength and therefore lend themselves to the stabilization of the permanent magnets. However, these materials are rare and cost-intensive.

SUMMARY OF THE INVENTION

The invention relates to an electrical machine, particularly to an electric motor having a stator and a rotor which is mounted rotatably around a rotor axis and has a rotor body, whereby at least two permanent magnets in the form of component magnets are arranged in receptacles of the rotor body, which extend from a radially inner end along their respective longitudinal axis to a radially more outward end, a first component magnet of which belongs to a first set of permanent magnets and a second to a second set of permanent magnets, and whereby the permanent magnets of the first set differ from the permanent magnets of the second set with respect to the material composition, particularly with respect to the magnetic properties.

It can also be provided in this case that in each case at least two permanent magnets in the form of component magnets are arranged within the receptacles, the first permanent magnet belonging to a first set of permanent magnets and a second to a second set of permanent magnets.

It is therefore an object of the invention to provide an electrical machine, which is inexpensive to manufacture, on the one hand, and is to be made stable and reliable to operate. In addition, the machine should have a high demagnetization resistance at a high achievable power density.

In an embodiment, at least one permanent magnet of the first or second set or at least one composite body with two permanent magnets of the first set or the second set or a composite body with a permanent magnet of the first set and a permanent magnet of the second set has a contour whose cross-sectional area, perpendicular to the longitudinal axis, decreases within the respective receptacle, at least in sections, toward its radially more outward end.

In the machine of the invention, permanent magnets of different composition can be used, which, for example, includes materials with different coercive field strengths. As a result, materials with higher coercive field strengths can be used in the area of the rotor where the permanent magnets are exposed to increased interfering magnetic field strengths, whereas materials with a lower coercive field strength and, for example, a higher magnetic remanence can be used in other areas of the rotor. The invention offers in particular the possibility of using two permanent magnets of different composition within a receptacle of the rotor, whereby then preferably the material with a higher coercive field strength can be used in the area of the receptacle and the rotor that is closest to the rotor gap and thereby is exposed to increased interfering magnetic fields.

Two or three, four or also more permanent magnets of the first set and optionally also one or more permanent magnets of the second set can be disposed within a receptacle. These component magnets can be connected together by typical joining techniques such as gluing, soldering, welding, or a form-fitting connection or also be only placed together in a receptacle and there clamped or wedged.

Basically, the design of an inner rotor can be provided in the case of the electrical machine, so that a central rotor is present with centrifugal forces acting radially outward toward the magnetic gap during rotation. An outer rotor can also be provided, however, in which corresponding centrifugal forces are directed outward away from the rotor and thereby also from the inner stator.

Basically, the receptacles in the rotor or at least some of the receptacles, particularly those receptacles in which a plurality of permanent magnets are disposed, when viewed in cross section of the rotor, can run with their respective longitudinal axes in a spoke-like manner outward away from the rotor axis. However, other arrangements of the receptacles in the rotor body are also conceivable, such as, for example, a V-shaped arrangement of the longitudinal axes of the receptacles for each permanent magnet pair. The individual legs of the particular V arrangements in this case do not run radially to the rotor axis but obliquely to the radial direction, whereby, however, a radially more inward region of the particular receptacle and a radially more outward region of the receptacle are provided.

Further, the invention provides that the or several of the permanent magnets have a contour that allows an at least partial form-fitting securing within the particular receptacle ("partial" in this respect can mean, for example: exclusively against radially acting centrifugal forces).

The prior art features cuboid permanent magnets, which are taken up in suitably formed receptacles of the rotor body, whereby projections protruding on the rotor body are formed in the radially outer region of the magnetic gap in order to hold the particular permanent magnets in the receptacle. The receptacles of the rotor body are thereby preferably open toward the magnetic gap, so that at least when an inner rotor is present the permanent magnets are pressed outward against the projections of the rotor body at high rotational speeds and accordingly large acting centrifugal forces. Because to increase the efficiency of an electrical machine the magnetic gap is usually kept small, the thickness of the projections of the rotor body that are to retain the permanent magnets is also limited and these can break during operation.

The embodiment of the invention for the permanent magnets allows a better distribution of the centrifugal forces at the edge surfaces of the receptacles, and the corresponding projections on the rotor body for retaining the permanent magnets can in particular be completely omitted. This results in a higher operational reliability of the electrical machine, whereby moreover the power density can be increased, in that the permanent magnets also extend directly up to the cylindrical outer surface of the rotor and, for example, can align with it.

An advantageous embodiment of the invention is achieved in that the permanent magnets and/or composite bodies which are made up of two or more permanent magnets and whose cross section decreases toward the radially more outward end of a receptacle at least in sections, at least at their radially outer end, particularly with their entire outer contour, fit together form-fittingly with the respective receptacle.

Because a permanent magnet and/or a composite body lie against the edge of the receptacle(s) at least in the area of their radially outer end, i.e., where because of acting radial centrifugal forces suitable retention forces of the rotor body are necessary, an extensive contact is provided there, which leads to a distribution of pressure forces and thereby stresses the radially outer edge surfaces of the receptacle(s) in the rotor body only to a reasonable extent. The fitting together of a permanent magnet/composite body with the respective receptacle in a form-fitting manner is already achieved when in the radial direction the particular body lies at least on a partial area against a corresponding complementarily formed contact surface in the edge region of the receptacle. The force distribution is understandably the better, the larger the contact surface, i.e., the farther the area extends in which the permanent magnet fits form-fittingly with the edge of the receptacle.

In particular, the permanent magnet/composite body can be fitted completely form-fittingly into a corresponding receptacle of the rotor body.

This can be achieved, for example, totally or partially in that the permanent magnet/composite body has a plurality of component bodies within the receptacle of the rotor body or is produced within the receptacle by deep injection or casting.

The invention can be used especially advantageously in an electrical machine, i.e., a rotor or a generator, if the rotor is formed as an inner rotor and is surrounded by a stator.

In this case, the rotor forms a massive cylindrical body in which there is suitable space to arrange and orient the receptacles for the permanent magnets in an optimized way.

Independent of this optimized design, the invention can also be used in electrical machines with an outer rotor/external rotor.

A further advantageous embodiment of the invention provides that one or more permanent magnets of the first or second set or one or more composite bodies have a barrel-shaped contour in the rotor's cross section or a radially outwardly tapering contour.

Overall, the radially outward tapering contour of the permanent magnets/composite bodies, when viewed in cross section perpendicular to the rotor axis, can be realized in different ways. Such a form can be realized, for example, by a contour, which is circular or oval in cross section, of a permanent magnet or a composite body or by a barrel-shaped structure or also by a substantially triangular or trapezoidal structure, whereby a radially outward tapering area is provided at least in sections. In a composite body having two or more individual bodies, one of these bodies, or a plurality of bodies or also all bodies, can accordingly taper radially outward in sections. For example, two or more permanent magnets with a round or oval cross section can be lined up one behind the other in the radial direction and connected together or only abutting one another. The term composite body is to be understood in the sense that an entire body can have a number of individual bodies, which are either connected together or are arranged directly adjacent to one another and in contact with one another. Composite bodies can also be understood as a body that is made up of a number of different bodies or is mixed in sections from a number of different materials. In this case, the fractions of the different bodies can have different material compositions and, for example, different coercive field strengths and/or different magnetic remanences.

The invention can be realized advantageously in that one or more permanent magnets or composite bodies has/have a stepped cross-sectional enlargement toward the radially inner end of the particular receptacle.

A suitable contact surface can also be created form-fittingly to the corresponding edge surface of a receptacle, abutted by the step, by such a step that is provided at one body or between two bodies in their transitional region.

A further advantageous embodiment of the invention provides that a composite body has a radially more outward and a radially more inward permanent magnet and that the radially more inward permanent magnet has a larger cross-sectional area at the joining site between the two permanent magnets than the radially more outward permanent magnet in the same region.

In this case, the radially more inward and the radially more outward permanent magnets are advantageously connected together, so that the form-fittingly held radially inner permanent magnet by its connection to the more outward permanent magnet holds the latter when centrifugal forces occur.

It can be provided further advantageously that the radially more outward permanent magnet has a higher coercive field strength than the radially inner part of the permanent magnet(s)/composite body. This has the result that the radially outer permanent magnet, which tends to be exposed to higher magnetic interference fields in the area of the magnetic gap of the electrical machine, has a high stability to demagnetization by such interfering magnetic fields than the radially inner part. This should also apply particularly at higher temperatures, for example, above 120° C.

In this regard, moreover, it can be provided advantageously that at least two joined permanent magnets of at least one composite body have magnetization directions parallel to one another.

In this regard, different pattern forms of the magnetic flux are conceivable overall in the rotor body, whereby the positive properties can be easily combined with different permanent magnets within a receptacle, when their magnetization directions are parallel to one another.

Overall, a V-shaped arrangement of pairs of permanent magnets and/or composite bodies can be provided in the rotor body. Typically, a plurality of such V-shaped arrangements are distributed along the circumference of a rotor. A V-shaped arrangement in this case has two receptacles within the rotor body which form the individual legs of a V in the cross section of the rotor and which in each case take up one or more permanent magnets and/or composite bodies. The individual legs of the V-shaped arrangement in this case need not be formed as slots bound by straight lines, but they can take up form-fittingly in each case barrel-shaped permanent magnets or groups of permanent magnets/composite bodies lined up one behind the other, which for their part can be made individually barrel-shaped, circular or trapezoidal in cross section, or the like.

Optimized magnetic flux properties in the rotor body can be achieved by such a V-shaped design, whereby by a convex design of the individual legs of the V or by the convex design of sections of the legs of the particular V, a higher overall magnetic flux and thereby a higher energy density can be achieved overall for the electrical machine.

The individual permanent magnets and/or composite bodies can be advantageously provided within the rotor in groups in a Halbach array as components of a magnetic circuit.

With the known Halbach array of magnets, a much higher field strength can be realized on the one side of a row of magnets and on the respective opposite side of the magnets. The Halbach array in the present case is arranged in the circumferential direction of a rotor such that the side of the higher field strength is turned toward the magnetic gap of the machine. To create a Halbach array, different types of magnets, particularly from a first set, a second set, and a third set of magnets, can be combined with one another.

A further advantageous embodiment of the invention provides that the first set of permanent magnets has a lower mass fraction of rare earths than the second set, particularly no rare earth content.

In this case, the circumstance can be utilized advantageously that compared with materials containing no rare earths, such materials with rare earth contents typically can have an increased coercive field strength and, on the other hand, also or alternatively an especially high remanence.

In this case, particularly in the case of a mass fraction of so-called heavy rare earths, a high coercive field strength can be achieved, i.e., by using the elements: yttrium, gadolinium, terbium, dysprosium, holmium, erbium, thulium, ytterbium, and/or lutetium. Light rare earths such as scandium, lanthanum, cerium, praseodymium, neodymium, promethium, samarium and/or europium more likely tend to increase the remanence. Basically, however, it can be advantageous to manage with as little as possible or even no mass fractions of heavy rare earths, especially with mass fractions below 1%. The mass fraction of light rare earths advantageously can be in a range between 5 and 25%, and more advantageously in a range between 10 and 20%.

In addition, it can be provided advantageously that the first set of permanent magnets contains no rare earths, and that the second set of permanent magnet has light rare earths at least in fractions. In this case, it can be provided advantageously that the permanent magnets from the second set of permanent magnets are used preferably more removed from the magnetic gap of the electrical machine than the permanent magnets of the first set or that all permanent magnets of the second set are more removed radially from the magnetic gap than the permanent magnets of the first set.

The described measures achieve that, on the one hand, the permanent magnets closer to the magnetic gap are produced from a material with a higher coercive field strength and lower magnetic remanence than the permanent magnets with a greater distance to the magnetic gap.

A further advantageous refinement of the invention is that the rotor body has in addition pockets with permanent magnets of a third set, whereby the permanent magnets of the third set differ from the permanent magnets of the first and second set with respect to the material composition, particularly the magnetic properties, and in particular are arranged in each case symmetrically between the receptacles, which take up the permanent magnets of the first and second set.

The permanent magnets of the third set, for example, in a spoke-like arrangement, constructed symmetrically around the rotor axis of the rotor, of the permanent magnets of the first and second set are advantageously symmetrically arranged between the spokes, or in V-shaped designs of pairs of permanent magnets or permanent magnet groups, the permanent magnets of the third set can be arranged in each case centrally between the legs of the V form. The material composition of the permanent magnets of the third set differs from the composition of the permanent magnets/composite bodies of the first and second set, whereby the composition of the first and second set can also be the same among each other. The magnetization direction of the permanent magnets of the third set is advantageously rotated within the cross-sectional plane of the rotor through an angle range between 60° and 120° to the magnetization direction of the permanent magnets of the first and second group, advantageously oriented perpendicular to the magnetization direction of the permanent magnets of the first and second group and/or in the radial direction of the rotor body. In this way, the permanent magnets of the third set can optimize the design of the magnetic flow pattern in the rotor body and thereby further increase the power density of the electric machine and/or contribute to the formation of a Halbach array.

In particular, the permanent magnets of the third set in each case are arranged in a closed recess/pocket of the rotor body.

Exemplary embodiments of the invention will be described in greater detail hereinafter using a drawing, where:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows in cross section a rotor and part of a stator of an electric motor;

FIG. 2 shows a further rotor of an electric motor in cross section;

FIG. 3 shows in a cross section a permanent magnet configuration;

FIGS. 4-11 show in cross section further permanent magnet configurations;

DETAILED DESCRIPTION

Figure 12:
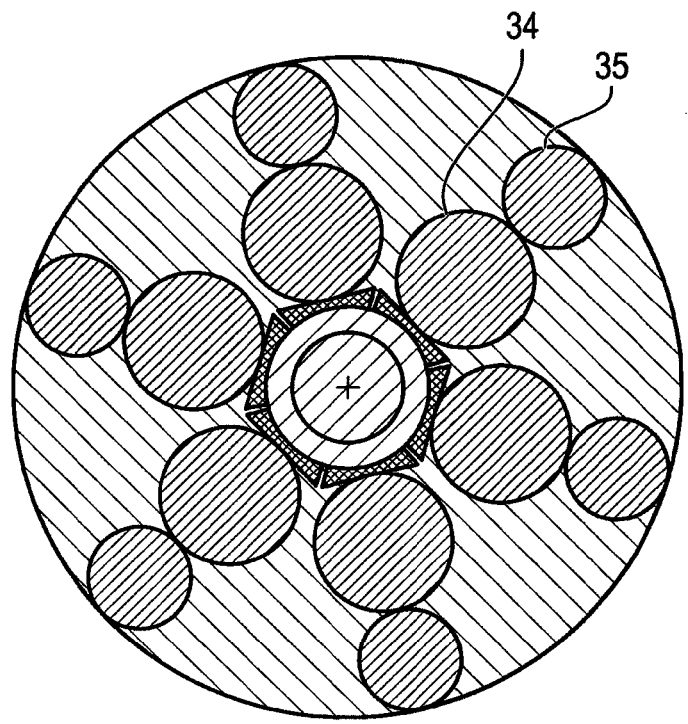
FIG. 12 shows in cross section a further rotor of an electric motor.

FIG. 1 shows a rotor 1 of an electric motor, which is mounted rotatably within a stator 2 around a rotor axis 3. It can be seen in the cross section of FIG. 1 that six permanent magnets 5, 6 are retained in receptacles 5a, 6a within rotor body 4, whereby longitudinal axes 7 of the receptacles are oriented radially with respect to rotor axis 3. This type of construction is a so-called spoke-shaped arrangement of the permanent magnets. Magnetic gap 8 is illustrated as excessively large in FIG. 1. It is formed between the stator and the cylindrical outer surface of rotor 1.

In order to achieve an especially high efficiency of a corresponding electric motor, efforts are made to design magnetic gap 8/rotor gap as small as possible.

Permanent magnets 5, 6 do not quite reach the cylindrical outer surface of rotor 1, because they are retained in the receptacles by projections 9, 10 of the rotor body in the area of the radially outer part of receptacles 5a, 6a. In particular, during rapid rotation, centrifugal forces act radially outward on permanent magnets 5, 6, so that projections 9, 10, which retain each of the individual permanent magnets, are exposed to considerable forces.

FIG. 2 shows an array of a rotor 1' and a stator 2', whereby in stator 2' in the cross section so-called stator teeth 11, 12 are shown, which in each case support electrical windings 15, 16 in stator slots 13, 14 lying between them. Windings 15, 16 can be supplied with a time-varying current by control electronics (not shown) for generating a rotating electric field.

Rotor 1' supports in the receptacles permanent magnets 5', 6', which are oriented spoke-like to rotor axis 3 and in each case are divided in two in the radial direction and in each case are formed as composite bodies with a first component magnet 17 and a second component magnet 18. Permanent magnets 5', 6' can be retained in the receptacles, for example, by means of projections as shown in FIG. 1 and there designated with 9, 10 or be held in these by known joining techniques such as, for example, gluing, soldering, welding, clamping, or a form-fitting connection. Permanent magnets 5', 6' extend radially up to the cylindrical outer surface of the rotor and are flush with it.

It can be provided that component magnet 17, lying radially more outward in the particular receptacle, is formed from a first set of permanent magnets in each case as a ferrite part or with a content of ferrite materials, whereas the radially more inward component magnet 18, which belongs to a second set of permanent magnets, is formed of a material containing rare earths. Advantageously, this component magnet contains predominantly light rare earths, particularly a higher proportion of light rare earths than of heavy rare earths, and more advantageously no heavy rare earths.

Using the described constellation achieves that the permanent magnet constellation as a whole in the region in which the greatest magnetic yield strengths act, i.e., in the vicinity of the magnetic gap, has a ferrite material, which is cost-effective and has a sufficient coercive field strength, whereas the high magnetic remanence of rare earth materials is utilized in component magnets 18 that are radially more inward and farther removed from interfering magnetic fields. It is prevented in this way that a demagnetization occurs in the region of the magnetic gap, whereby overall a minimal proportion of rare earth materials is employed.

For the further advantageous design of the magnetic fields within the rotor/rotor body, it is provided according to FIG. 2 that additional permanent magnets 19, 20 of a third set of permanent magnets are inserted in each case between two spoke-like adjacent permanent magnet arrays. The possible magnetic field or magnetic flux arrays thereby achieved, for example, Halbach arrays, will be discussed in greater detail below.

FIGS. 3 to 11 describe in cross section permanent magnet arrays with 2 permanent magnets each, which have a first component magnet in the respective top area of the illustration and a second component magnet in the respective bottom area of the illustration. Basically, the figures are laid out so that the bottom area of the illustration of the rotor axis of a rotor of an electromagnet is farther away than the top area. The corresponding permanent magnet arrays in this case can be used in a spoke-like arrangement with respect to the rotor axis, but a so-called V-shaped array of permanent magnets is also conceivable, which will be discussed in greater detail below. The particular permanent magnet arrays are advantageously placed in receptacles of a rotor body, which are advantageously formed form-fittingly in relation to the permanent magnet arrays; i.e., the permanent magnet arrays are surrounded without a gap. It can also be provided, however, that the receptacles surround the particular magnet arrays form-fittingly only in sections, for example, in the area in which the cross section of the permanent magnet array decreases when viewed in the radially outward direction.

In FIG. 3, rotor axis 3 is drawn in by way of example above the permanent magnet array. The cross section of both component magnets 17, 18 is rectangular and of the same size, so that the entire magnet array is formed rectangular with an unchanging cross section. Magnetization directions 21, 22 of both component magnets 17, 18 are indicated by arrows, as is also the case in all other permanent magnet arrays in FIGS. 3 to 11.

In FIG. 4, in the case of the radially inner component magnet 17' in the radially inner region a rectangular extension 23 is provided, by which the magnet array is retained in the receptacle in the case of radially acting centrifugal forces. It should be noted in principle that according to FIGS. 3, 4, 5, 6, 7, and 11, the radially inner component magnet of the magnet array is formed longer in the radial direction than the radially outer component magnet. According to FIGS. 8, 9, and 10, the distribution is reversed, with the radially inner component magnet formed shorter in the radial direction than the radially outer component magnet.

FIG. 5 shows a trapezoidal cross section of the radially inner component magnet 24, whereby the trapezoid tapers off radially outward. The radially outer component magnet 18" is made rectangular.

FIG. 6 shows a radially inner component magnet 25 with a rectangular extension 23', whereby the radially outer component magnet 26 is formed trapezoidal in cross section and widening radially outward.

FIG. 7 shows the radially inner component magnet 24' with a trapezoidal shape in cross section which tapers radially outward, whereby the radially outer component magnet 26' is formed as a trapezoid, as shown in FIG. 6, tapering radially inward.

All arrays shown in FIGS. 4 to 7 have undercuts, which reliably prevent a radial slipping radially outward out of a suitably formed receptacle in a rotor body.

FIG. 8 shows a cross section of a rectangular magnet array, whereby the radially inner component magnet 27 has a smaller dimension in the radial direction than the radially outer component magnet 28.

The magnet array in FIG. 9 shows in cross section a rectangular radially inner component magnet 27', whereby the radially outer component magnet 29 is formed trapezoidal in cross section and tapers radially outward with respect to rotor axis 3.

According to FIG. 10, both component magnets 29' and 30 are formed trapezoidal in cross section, whereby in each case the trapezoids taper radially outward with respect to the rotor. In addition, between component magnet 29' and component magnet 30 a projection 31 is formed at the joining surface in that the smaller surface area of the trapezoidal form of component magnet 30 is larger than the larger surface area of the trapezoidal cross-sectional form of component magnet 29'.

Thus, an abrupt reduction in the cross-sectional area is provided at the transition or at the joining site between the radially inner component magnet 30 and the radially outer component magnet 29'.

FIG. 11 shows a cross-sectional array in which the radially inner component magnet 32 is made rectangular and the radially outer component magnet 33 is made trapezoidal, whereby the trapezoidal cross section of the radially outer component magnet 33 tapers radially outward.

The arrays shown in FIGS. 9, 10, and 11, like the arrays shown in FIGS. 4, 5, 6, and 7, have a reduction in their cross section from radially inward to radially outward, which in each case brings about the retention in a suitably formed receptacle of a rotor body.

In addition to the arrays shown in FIGS. 3 to 11, other cross-sectional arrays are conceivable, in which, for example, the boundary surfaces of the particular shown rectangle and trapezoid can also be replaced by convex or concave boundary lines, for example, also partially spherical and barrel-shaped boundary lines.

FIG. 12 shows, for example, in cross section a rotor of an electric motor with permanent magnet arrays/composite bodies arranged in a spoke shape, whereby each individual permanent magnet array has two component magnets 34, 35 circular in cross section, whereby each radially outer component magnet 35 has a smaller diameter in cross section than the radially inner component magnet 34. However, it can also be provided that each outwardly disposed component magnet has a larger diameter than the radially inner component magnet seen in each case in cross section. Retention of the magnet arrays in suitably shaped receptacles already occurs due to the form which is circular in cross section.

Here as well, preferably the radially outer component magnet 35 can include a ferrite or ferrite-containing material and the radially inner component magnet 34 either also of a ferrite material or of a rare earth-containing material or of a mixture of both materials. Likewise, the component magnets of the radially inner group 34 can have a different material than the radially outer component magnets 35.

Figure 13:
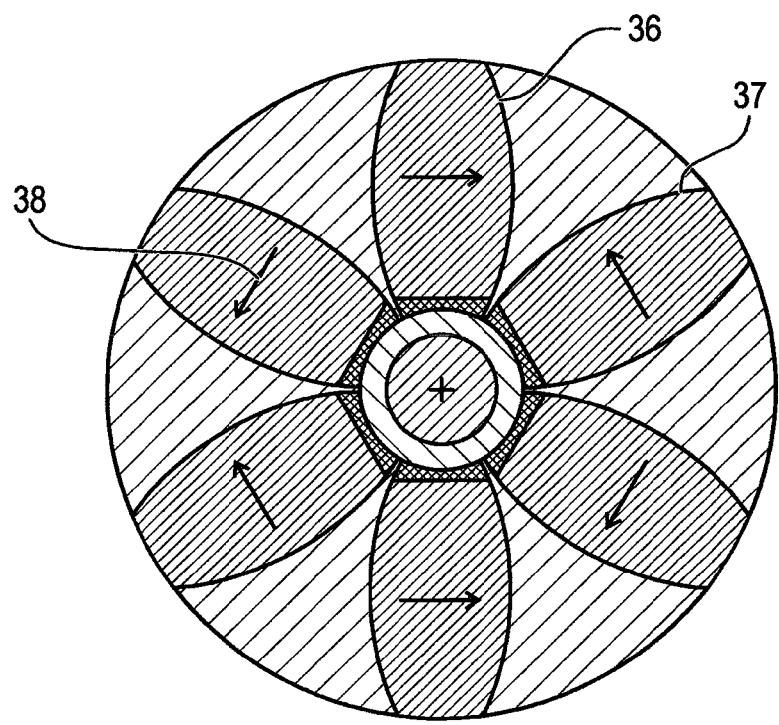
FIG. 13 shows in a further cross section a further rotor of an electric motor with permanent magnets which are barrel-shaped in cross section.

FIG. 13 shows in cross section a permanent magnet arrangement of a rotor with permanent magnets 36, 37 each of which is barrel-shaped in cross section. It is indicated here that the magnetization indicated by the azimuthally oriented arrows 38, in two permanent magnets 36, 37, arranged in adjacent receptacles, is directed in opposite directions.

The barrel-shaped cross-sectional form of permanent magnets 36, 37 by its undercut in the radial direction also brings about a retention in suitably shaped receptacles of the rotor body. Therefore, projections 9, 10 as shown in FIG. 1 can be completely omitted and the permanent magnets and composite bodies 34, 35, 36, 37 can extend up to the cylindrical outer surface of the rotor. As a result, a smaller distance of the permanent magnets to the stator and thereby a high efficiency of the electrical machine or a high power density are or can be achieved.

Figure 15:
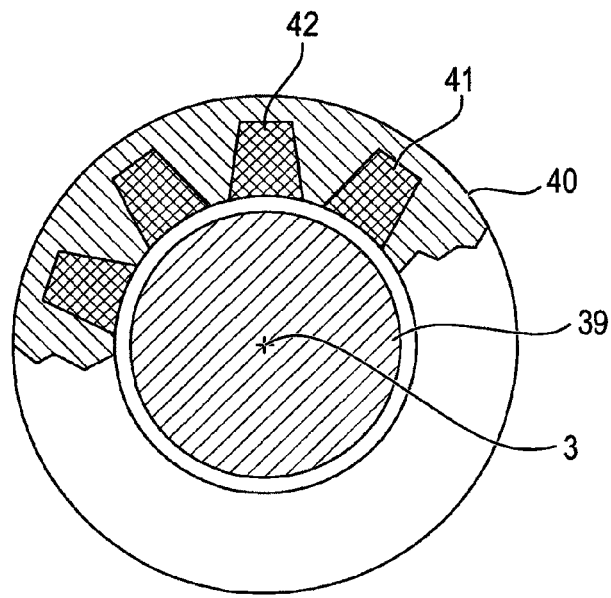
FIG. 15 shows in cross section an outer rotor and an inner stator of an external rotor motor.

To round off the invention, FIG. 15 shows an array with an inner stator 39 and an outer rotor in the form of a hollow cylindrical rotor 40. The rotor axis is designated by 3 and rotor 40 is mounted rotatably around rotor axis 3.

Permanent magnets 41, 42, which are oriented in a spoke-shaped arrangement on rotor axis 3 and taper radially outward in cross section, are shown within the rotor body. The receptacles, in which permanent magnets 41, 42 are held, are accordingly designed form-fittingly.

Figure 14:
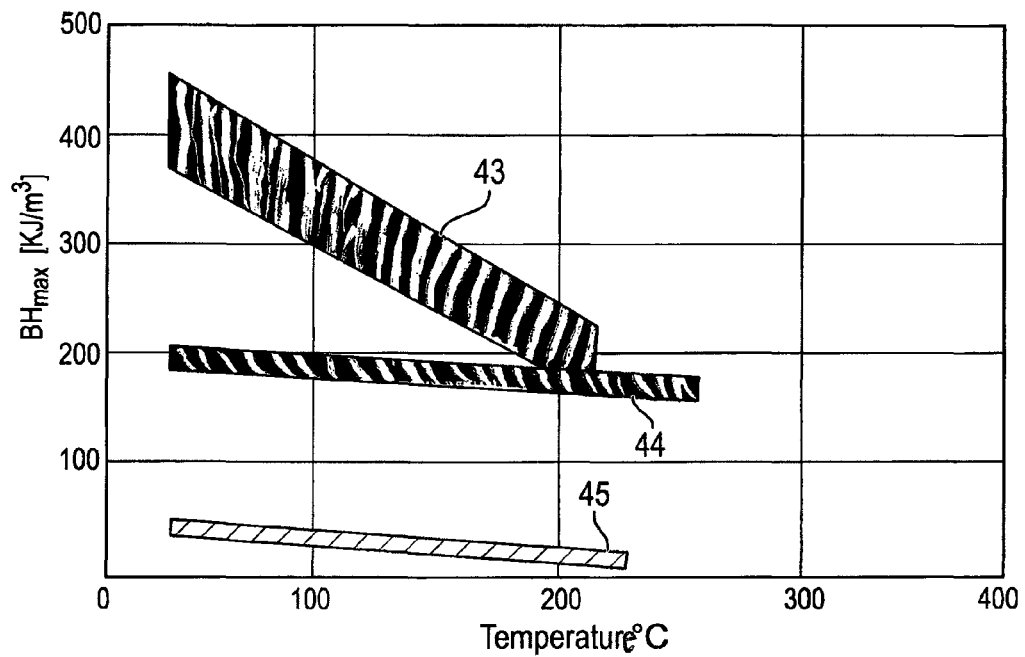
FIG. 14 shows a diagram with parameters of magnetic materials.

With FIG. 14 it is to be shown that especially during use of special geometric arrays of permanent magnets, as are illustrated in the figures of this application, apart from the use of different materials for the component magnets of a single rotor, particularly also apart from the use of different materials for different component magnets of a composite body, the number of employed different materials for the used permanent magnets of a rotor can also be reduced by suitable material selection. Especially materials that includes a mixed material are especially considered here, whereby the mixture is adjusted such that the mixed material has a remanence field strength Br between 0.6 tesla and 1 tesla. Alternatively or in addition, the mixed material can have the property that the coercive field strength Hcj is between 1300 and 2500 kA/m. When such a material is used, particularly if permanent magnets in the form of composite bodies are used, advantageously two or more component magnets of a composite body can include the indicated material. This material in the radially inner region of the rotor is of the same composition and has the same physical properties as in the radially outer part of the composite body and therefore also the same composition in the region close to the magnetic gap as in the region far from the magnetic gap. Such materials can be produced, for example, from ferrite and ferrite-like substances, particularly with addition of rare earth metals, whereby these mixed materials advantageously can be free of heavy rare earth materials. Overall, therefore, the use of rare earths in permanent magnets in a rotor can be reduced. The necessary or advantageous values for the remanence field strength and the coercive field strength can be achieved with such a material. In FIG. 14, a substance of the class Nd/Dy/Th/Fe/B, represented by its values of the coercive field strength, is plotted versus the temperature with the first cross-hatched area 43. It is evident that the coercive field strength declines considerably in the range of a relatively high operating temperature of 180 to 200° C. of a motor. The third cross-hatched region 45 shows the corresponding parameter range of conventional ferrites. The second cross-hatched region 44 shows the substances used according to the invention, which, for example, can be produced as a mixture between ferrites and rare earths, whereby the coercive field strength lies between that of the rare earth materials and ferrites, whereby the temperature dependence of the coercive field strength is substantially lower than in the more or exclusively rare earth-containing magnetic materials. Advantageously, a temperature dependence between −0.11% and 0% per kelvin with regard to the remanence field strength Br is realized in the case of suitable mixed materials. These values should be maintained between −50° C. and +180° C.

Moreover, in regard to the coercive field strength Hcj a temperature coefficient of −0.5% to +0.4% per kelvin can be realized, which is applicable between a temperature of
 −50° C. and +180° C.

Suitable mixed materials can be produced as polymer-bound hybrids, whereby NdFeB can be mixed in powder form with a ferrite powder. In particular, because the temperature dependence of the coercive field strength of NdFeB is negative and that of ferrite powders is positive, a lower temperature coefficient can be set by a suitable mixture. The individual powders can be produced magnetically anisotropic by suitable known processes such as grinding of pre-magnetized materials and used. As a result, the magnetically attenuating effect of the polymer binder can be compensated. The production and binding of the corresponding magnetic bodies can occur in a strong magnetic DC field in order to achieve a suitable orientation of the anisotropic powder materials. It is possible, moreover, to mold the magnetic bodies in the receptacles of the particular rotor body by injection molding, high-pressure injection molding, and other techniques.

Figure 16:
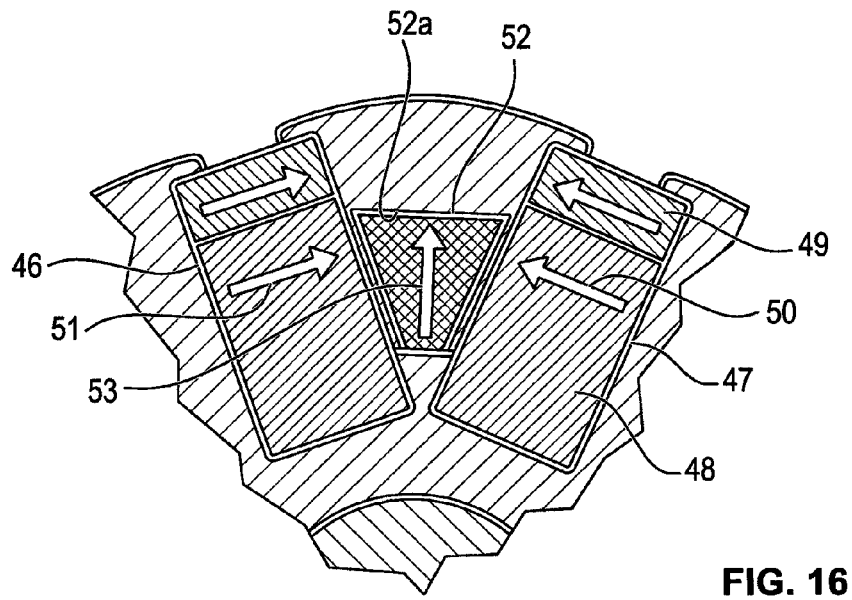
FIG. 16 shows in cross section a detail of another rotor of an electric motor.

The field strength necessary for a suitable efficiency of the described electrical machine can be achieved by the mentioned materials particularly when suitable geometric arrays of the permanent magnets are used, optionally with an optimized molding of the individual magnets. In this regard, FIG. 16 shows, for example, in cross section a detail of a rotor of an electrical machine with two permanent magnets, each of which is formed as a composite body 46, 47, whereby each composite body 46, 47 has two component magnets 48, 49. Magnetization directions 50, 51 are uniform for each composite body 46, 47 and opposite between composite bodies 46, 47. The radially outer component magnets 49 typically form permanent magnets of a first set, whereas the radially internally arranged component magnets 48 form the permanent magnets of a second set. The material composition of the permanent magnets of the first and second sets can be the same or also different. In addition, in FIG. 16 a permanent magnet 52 of a third set of permanent magnets can be seen, whereby this last mentioned permanent magnet 52 has a trapezoidal form in cross section, which tapers toward the radially inner region of the rotor. Magnetization direction 53 of permanent magnet 52 is directed radially outward.

The permanent magnets shown in FIG. 16 form a typical section of a Halbach array of permanent magnets, which produces an especially strong flux concentration on one side of a magnet array, therefore typically in the area of the magnetic gap. A permanent magnet 52 in an appropriate pocket 52a is provided each time between two composite bodies 46, 47, which are arranged spoke-like and formed of permanent magnets made up of two magnets 48, 49.

Figure 17:
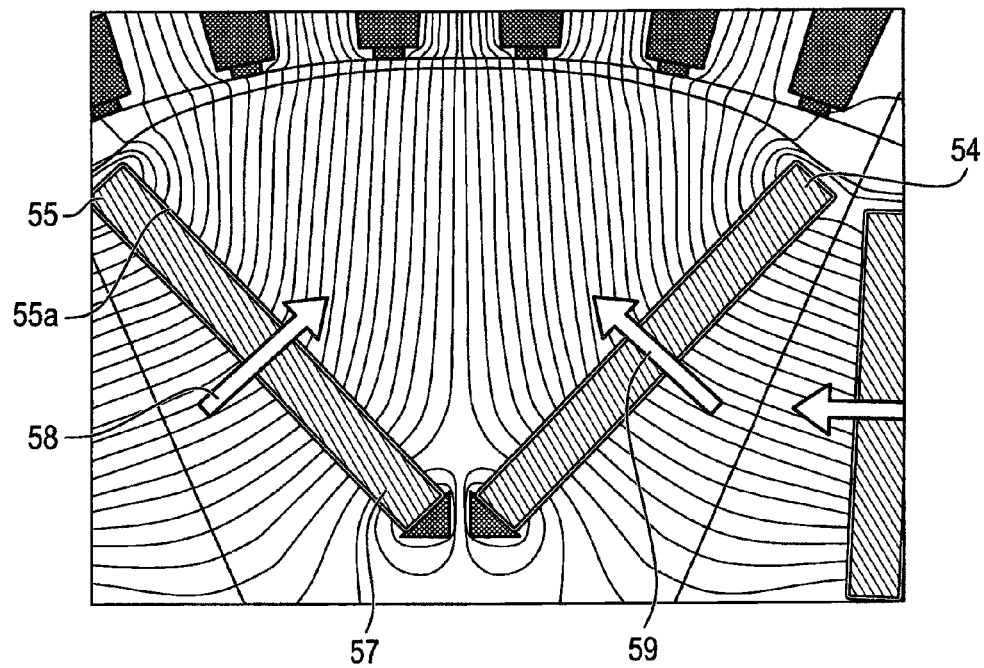
FIG. 17 shows in a partial cross-sectional illustration part of a rotor and a stator of an electric motor, whereby two permanent magnets are shown in a V configuration.
Figure 18:
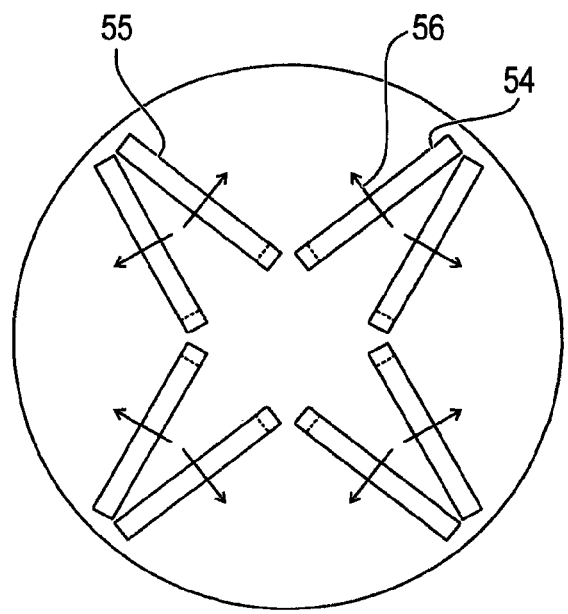
FIG. 18 shows in a schematic cross section a rotor of an electric motor, whereby the permanent magnets are arranged in V configurations.

FIG. 17 shows in cross section a permanent magnet array with two permanent magnets 54, 55 in a V arrangement, which are arranged in matching recesses 55a arranged correspondingly in a V shape. Permanent magnets 54, 55 each form a leg of an imaginary V, whereby permanent magnets 54, 55 with their longitudinal axes do not approach the rotor axis. The longitudinal axes of the permanent magnet rather intersect at a point, which is located radially outside the rotor axis at a distance from it. The array of such a so-called V-shaped arrangement of permanent magnets is shown schematically in the overview in FIG. 18. Four pairs of permanent magnets 54, 55 arranged in a V shape and the corresponding magnetization directions 56 are illustrated there. To clarify the configuration of the magnetic flux, the field lines between permanent magnets 54, 55 are drawn in FIG. 17. The V-shaped arrangement of permanent magnets 54, 55 results in an optimal field density in the area of the magnetic gap between the rotor and stator.

The individual permanent magnets 54, 55 can also be divided in their longitudinal direction and have each of two component magnets, as is indicated in permanent magnet 55 by a dashed line and the labeling of the radially inner component magnet with the reference number 57. All permanent magnets, however, can also is formed homogeneously of a single material. Permanent magnets/composite bodies 54, 55, arranged in a V shape and optionally having a plurality of component magnets, can also be assembled like the arrays shown in FIGS. 3 to 11. In other respects, the magnetization direction of the permanent magnets is indicated by arrows 58, 59 in FIG. 17.

Figure 19:
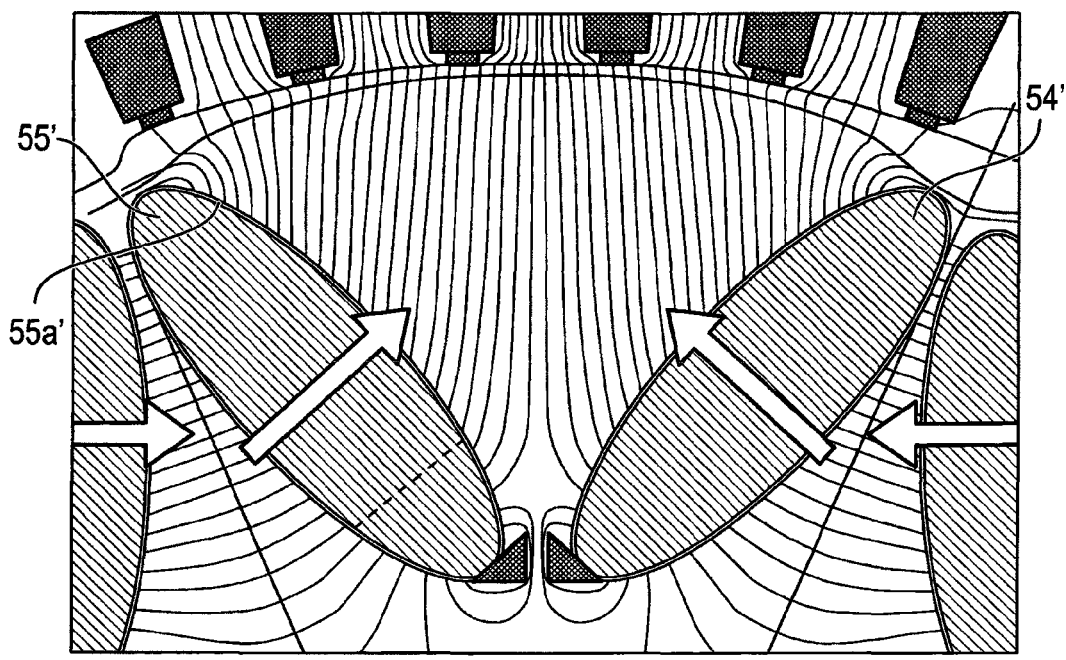
FIG. 19 shows partially a cross section of a rotor and a stator of an electric motor with permanent magnets in a V configuration.

In FIG. 19, a similar array is shown in cross section as in FIG. 17, whereby the individual permanent magnets 54', 55' are formed barrel-shaped or oval in cross section, however. This results in a good retention in suitably shaped receptacles 55'a of the rotor body and in a further optimized field design, as will be described in still greater detail below with FIGS. 22 and 23. The permanent magnets shown in FIG. 19 can include a plurality of component magnets of a first and second set of permanent magnets as well.

Figure 20:
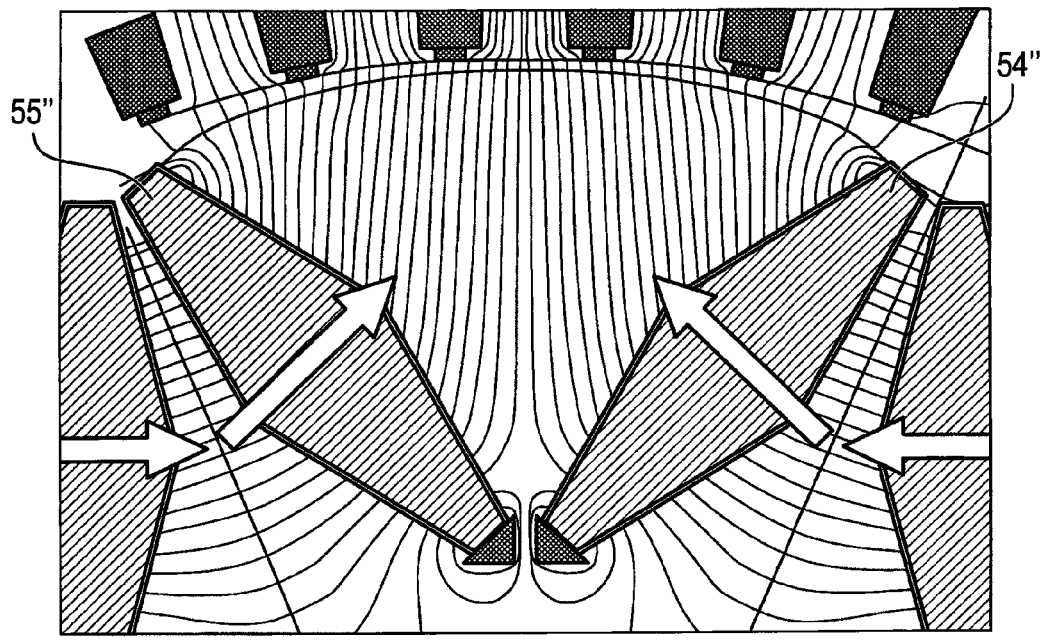
FIG. 20 shows an arrangement as illustrated in FIG. 19 with permanent magnets shaped as double trapezoids in cross section.

FIG. 20 shows an illustration according to FIGS. 17 and 19, whereby permanent magnets 54", 55" in cross section has two trapezoidal quadrilaterals, whose bases abut one another, whereby the individual trapezoidal bodies are connected as one piece or can also represent component magnets, which are combined to form a composite body.

The magnetization directions are indicated similar to FIGS. 17 and 19 in the form of arrows.

Instead of the shown two trapezoidal bodies, two component magnets each, barrel-shaped in cross section, namely, a radially inner and a radially outer partial body, can form a composite body either connected together or at least adjacent to one another.

Figure 21:
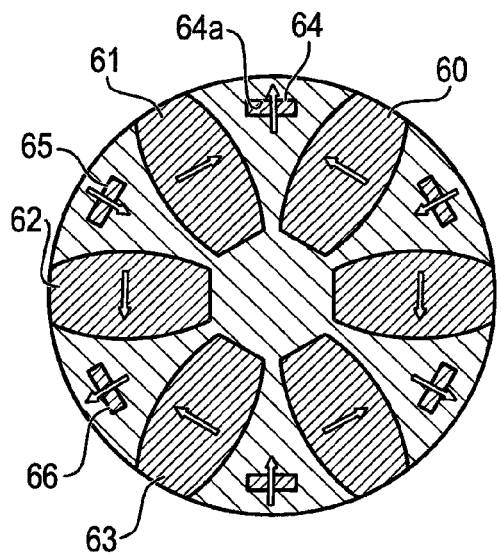
FIG. 21 shows a cross section of a rotor with permanent magnets, formed barrel-shaped in cross section, in a spoke arrangement.

FIG. 21 shows by way of example a so-called Halbach array of magnets, whereby the individual component magnets 60, 61, 62, 63, 64, 65, 66 of the Halbach array are lined up in the circumferential direction. Basically, permanent magnets 60, 61, 62, 63 arranged spoke-like are provided, whereby a first pair 60, 61 has magnetization directions directed to one another, represented by arrows in FIG. 21. The adjacent pair of permanent magnets 62, 63 also has magnetization directions directed toward one another, whereby the magnetization directions of permanent magnets 61 and 62 are formed in the opposite direction to one another and directed away from one another.

The additional permanent magnets 64, 65, 66, are each arranged between adjacent permanent magnets, having, alternating in the circumferential direction, a magnetization direction directed radially outward and radially inward. By this total array, the magnetic flux is minimized radially inward with respect to permanent magnets 60, 61, 62, 63 and the magnetic flux is maximized radially outside the magnets. An optimized magnetic field strength results in the area of the magnetic gap between the stator and rotor.

Figure 22:
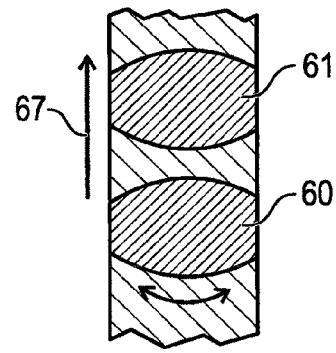
FIG. 22 shows a "rolled out" illustration of a rotor with permanent magnets, which are barrel-shaped in cross section.
Figure 23:
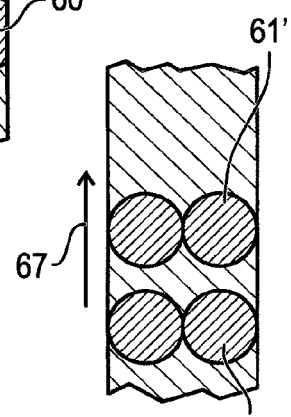
FIG. 23 shows a "rolled out" illustration of a cross section of a rotor of an electric motor similar to FIG. 22, whereby the permanent magnets, which are barrel-shaped in cross section, are formed barrel shaped as two parts.

In addition to the optimized arrangement and orientation of the permanent magnets, the magnetic field strength or flux can also be optimized by the external shaping of the individual permanent magnets. For clarification FIG. 22 shows a linear rolled out array of two permanent magnets 60, 61 lying next to one another in a cylindrical rotor. Closer examination of the magnetic and physical relationships shows that the remanence field strength of such an arrangement increases with a declining distance of the permanent magnets in the azimuthal direction, as indicated by arrow 67, as well as with the expansion of the individual permanent magnets in the azimuthal direction. In addition, the flux density can be increased in that the surface on which flux lines can emerge out of the particular permanent magnets in the azimuthal direction or enter them, is enlarged. Thus, due to the double barrel-shaped design of permanent magnets 60', 61', a still higher flux density results in the variant shown in FIG. 23 than in the array according to FIG. 22.

The measures for increasing the flux density within the rotor body or for designing the entire magnetic flux, described individually in the above examples, are to be understood as measures that can be combined for designing an optimized rotor, tailored to particular requirements. Thus, an electrical machine can be produced according to the invention, which allows a high power density and high torques of an electrical machine to be achieved with the lowest possible use of rare earth elements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical machine comprising:
a stator;
a rotor that is mounted rotatably around a rotor axis and has a rotor body; and
at least two permanent magnets in the form of component magnets are arranged in receptacles of the rotor body, which extend from a radially inner end along their respective longitudinal axis to a radially more outward end, a first component magnet of which belongs to a first set of permanent magnets and a second belongs to a second set of permanent magnets,
wherein the permanent magnets of the first set differ from the permanent magnets of the second set with respect to their material composition or magnetic properties, and
wherein at least one permanent magnet of the first or second set or at least one composite body with two permanent magnets of the first set or the second set or a composite body with a permanent magnet of the first set and a permanent magnet of the second set has a contour whose cross-sectional area, perpendicular to the longitudinal axis, decreases within the respective receptacle toward a radially more outward end at least in sections.

2. The electrical machine according to claim 1, wherein the permanent magnets and/or the composite bodies, whose cross section decreases toward the radially more outward end of a receptacle at least in sections, at least at its radially outer end with its entire outer contour, fit together form-fittingly with the respective receptacle.

3. The electrical machine according to claim 1, wherein the rotor is formed as an inner rotor and is surrounded by a stator.

4. The electrical machine according to claim 1, wherein one or more permanent magnets of the first or second set or one or more composite bodies in the cross section of the rotor have a barrel-shaped contour or a radially outward tapering contour.

5. The electrical machine according to claim 1, wherein one or more permanent magnets or composite bodies have a stepped cross-sectional enlargement toward the radially inner end of the particular receptacle.

6. The electrical machine according to claim 1, wherein a composite body has a radially more outward and a radially more inward permanent magnet and wherien the radially more inward permanent magnet has a larger cross-sectional area at the joining site between the two permanent magnets than the radially more outward permanent magnet in the same region.

7. The electrical machine according to claim 1, wherein, in each case, two joined permanent magnets of at least one composite body have magnetization directions parallel to one another.

8. The electrical machine according to claim 1, wherein the permanent magnets and/or composite bodies are part of a V-shaped arrangement of components of a magnetic circuit.

9. The electrical machine according to claim 1, wherein the permanent magnets and/or composite bodies are part of a Halbach array of components of a magnetic circuit.

10. The electrical machine according to claim 1, wherein the first set of permanent magnets has a lower mass fraction of rare earths than the second set or no rare earth content.

11. The electrical machine according to claim 1, wherein the second set of permanent magnets have a mass fraction of light rare earth elements and wherein the mass fraction of heavy rare earth elements is lower than the fraction of light rare earth elements or the mass fraction of heavy rare earth elements is zero.

12. The electrical machine according to claim 1, wherein the rotor body has pockets with permanent magnets of a third set, wherein the permanent magnets of the third set differ from the permanent magnets of the first and second set with respect to the material composition and are arranged symmetrically between the receptacles, which take up the permanent magnets of the first and second set.

13. The electrical machine according to claim 1, wherein the electrical machine is an electric motor.

* * * * *